United States Patent
Farradas

(10) Patent No.: US 10,308,069 B1
(45) Date of Patent: Jun. 4, 2019

(54) FRONT AXLE ADAPTER KIT

(71) Applicant: Rolando Farradas, Miami, FL (US)

(72) Inventor: Rolando Farradas, Miami, FL (US)

(73) Assignee: The Rolando Farradas Living Trust, Miami Lakes, FL (US)

( * ) Notice: Subject to any disclaimer, the term of this patent is extended or adjusted under 35 U.S.C. 154(b) by 406 days.

(21) Appl. No.: 14/816,472

(22) Filed: Aug. 3, 2015

(51) Int. Cl.
*B60G 9/04* (2006.01)
*B60B 35/00* (2006.01)
*B60B 35/14* (2006.01)

(52) U.S. Cl.
CPC ............ *B60B 35/007* (2013.01); *B60B 35/14* (2013.01); *B60G 9/04* (2013.01)

(58) Field of Classification Search
CPC ..... B60K 17/344; B60K 17/04; F16H 57/025; F16H 2057/02043; Y10T 74/2186
See application file for complete search history.

(56) References Cited

U.S. PATENT DOCUMENTS

| | | | | |
|---|---|---|---|---|
| 2,228,581 A * | 1/1941 | Olen | ................... | B60K 17/346 180/250 |
| 3,058,558 A * | 10/1962 | Hawk | ................... | B60K 17/352 180/247 |
| 4,037,429 A * | 7/1977 | Britzius | ................... | B60K 17/34 180/233 |
| 4,332,304 A * | 6/1982 | Barnow | ............... | B60K 17/352 180/233 |
| 4,641,547 A * | 2/1987 | Stich | ..................... | F16H 57/025 74/606 R |
| 9,327,571 B2 * | 5/2016 | Pierce | .................. | B60G 11/113 |
| 2002/0074852 A1 * | 6/2002 | Scrivens | ................... | F16D 9/06 301/6.5 |
| 2004/0251069 A1 * | 12/2004 | Austin | ................ | B60K 17/344 180/233 |
| 2008/0210050 A1 * | 9/2008 | Prettyman | ............. | B60K 17/04 74/606 R |
| 2009/0223725 A1 * | 9/2009 | Rodriguez | ............... | B60K 6/40 180/65.21 |
| 2015/0014512 A1 * | 1/2015 | Pierce | ................ | F16D 65/0056 248/674 |

* cited by examiner

*Primary Examiner* — Faye M Fleming
(74) *Attorney, Agent, or Firm* — Albert Bordas, P.A.

(57) ABSTRACT

A front axle adaptor kit, having a front differential assembly, first and second shock absorber brackets, a spring support bracket, a track-bar bracket, and a dampener bracket to convert a two-wheel drive production truck to four-wheel drive enabling a drivetrain that allows all four wheels of the truck to receive torque from an engine of the truck. The truck has a transmission system and is retrofitted with a transmission to transfer case adaptor kit, and a transfer case parking brake system adaptor kit and support mount.

2 Claims, 20 Drawing Sheets

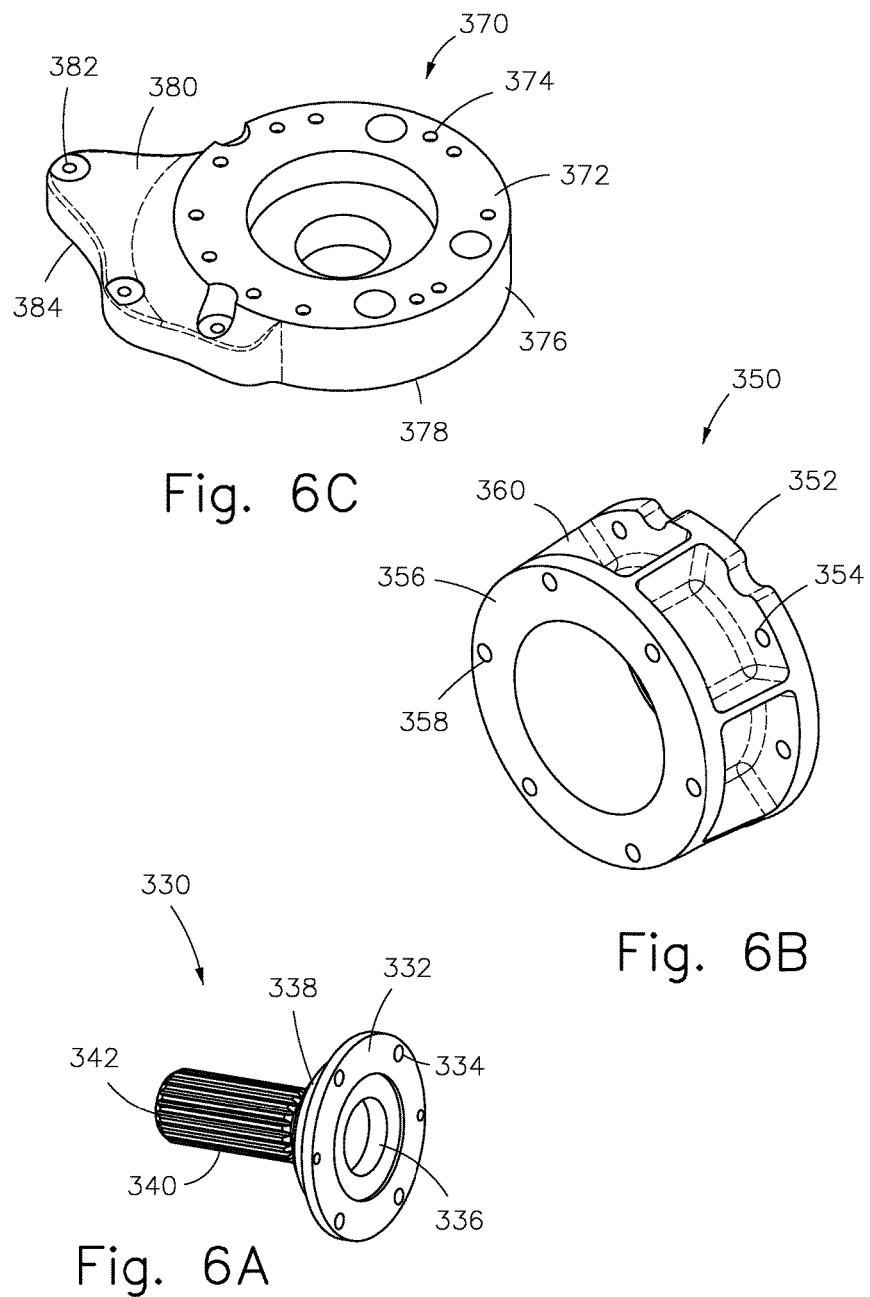

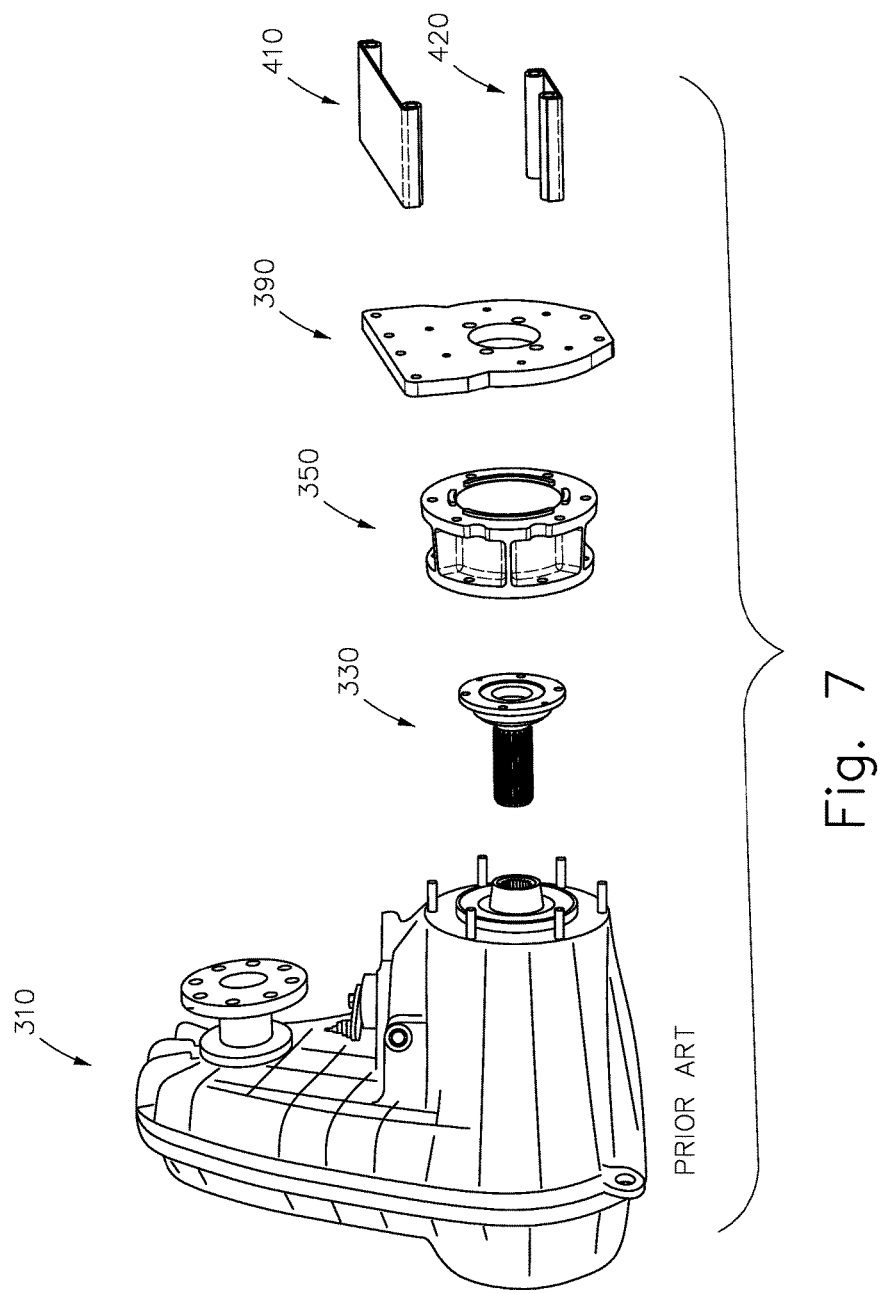

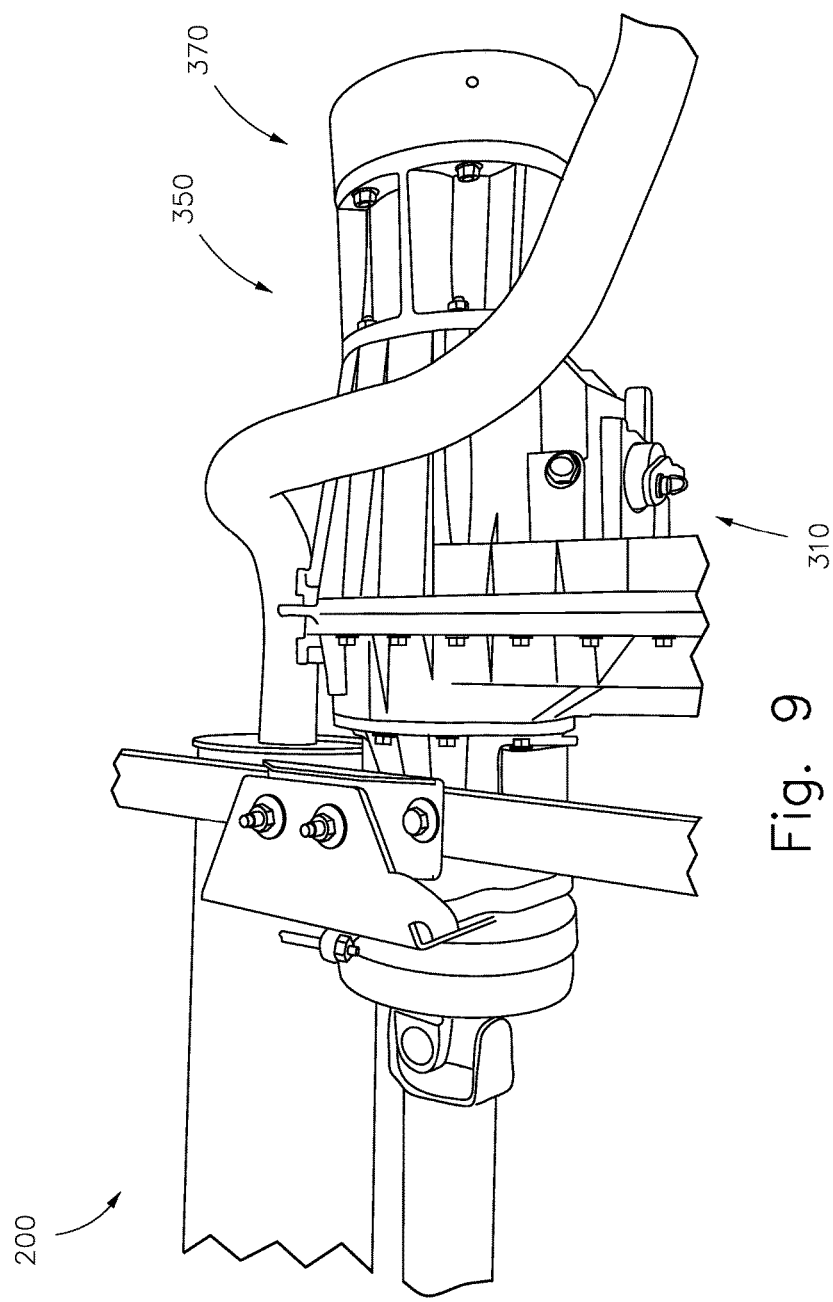

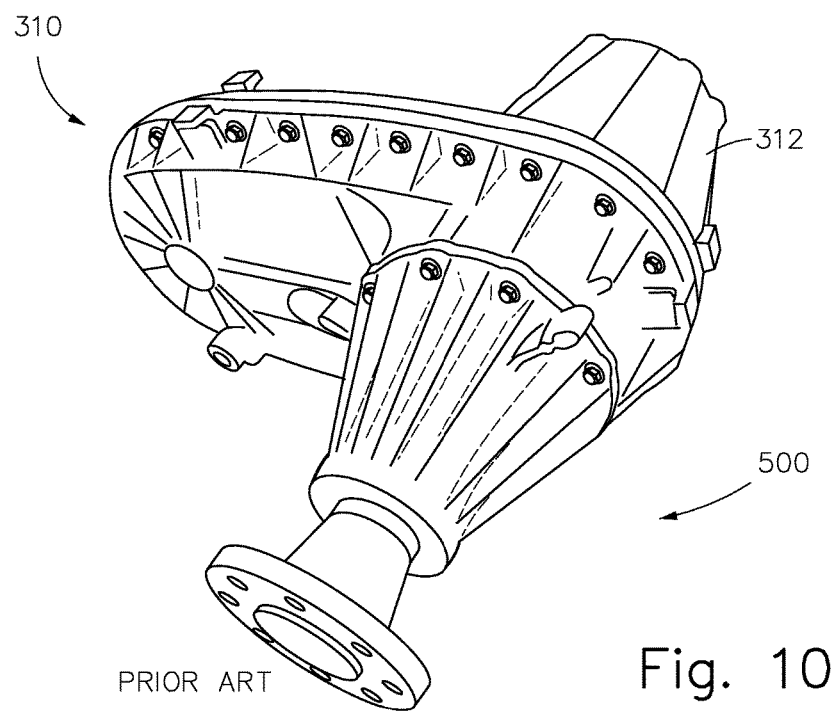
PRIOR ART  Fig. 10
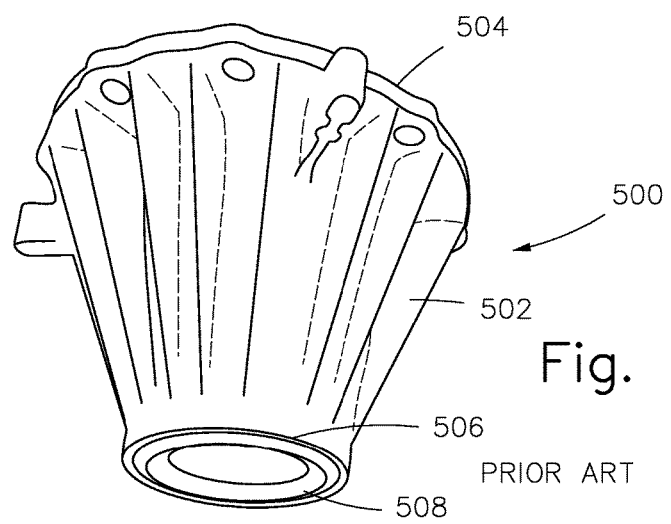
Fig. 10A  PRIOR ART

FRONT AXLE ADAPTER KIT

BACKGROUND OF THE INVENTION

1. Field of the Invention

The present invention relates to truck adaptor kits, and more particularly, to two-wheel to four-wheel conversion front axle adaptor kits.

2. Description of the Related Art

Applicant is not aware of any two-wheel to four-wheel conversion front axle adaptor kits that suggest the novel features of the present invention.

SUMMARY OF THE INVENTION

The present invention is a vehicle two-wheel to four-wheel conversion front axle adaptor kit, having a front differential assembly, first and second shock absorber brackets, a spring support bracket, a track-bar bracket, and a dampener bracket to convert a two-wheel drive production truck to four-wheel drive enabling a drivetrain that allows all four wheels of the truck to receive torque from an engine of the truck, whereby the truck has a transmission system and is retrofitted with a transfer case.

More specifically, the present invention is a front axle adaptor kit, comprising a front differential assembly, first and second shock absorber brackets, a spring support bracket, a track-bar bracket, and a dampener bracket to convert a two-wheel drive production truck to four-wheel drive enabling a drivetrain that allows all four wheels of the truck to receive torque from an engine of the truck. The truck comprises a transmission system and a retrofitted transfer case.

The front differential assembly comprises an axle housing, a front differential, and first and second axles. The first shock absorber bracket is positioned between the first axle and the front differential, and is welded onto the axle housing. The dampener bracket is positioned at a first predetermined distance from the front differential, and is welded onto the axle housing. The track-bar bracket is positioned at a second predetermined distance from the front differential, and is welded onto the axle housing. The spring support bracket is positioned at a third predetermined distance from the front differential, and is welded onto the axle housing. The second shock absorber bracket is positioned at a fourth predetermined distance from the front differential, and is welded onto the axle housing. The fourth predetermined distance is greater than the third predetermined distance. The third predetermined distance is greater than the second predetermined distance. The second predetermined distance is greater than the first predetermined distance.

Each of the first and second shock absorber brackets comprises a sidewall having at least one hole, and a cutout extending between first and second distal ends. The cutout is concavely shaped to mount onto the axle housing. Extending from the first distal end is an angled edge that extends to an upper perimeter edge. The upper perimeter edge extends to an end. Extending from the end is an upper sloped edge that continues to an upper rounded edge, which extends to a rear edge. Extending from the rear edge is a lower rounded edge that continues to a lower sloped edge, which extends to a lower corner. A lower perimeter edge extends from the lower corner to the second distal end.

The spring support bracket comprises an interior mount wall mounted onto a base. Extending from the interior mount wall are an upper mount wall and a lower mount wall that terminate at first and second distal edges respectively. The base has first and second ends, and first and second lateral ends. Also mounted onto the base is a spring support mount wall having an upper mount wall and a lower mount wall with third and fourth distal edges, and first and second holes respectively.

The track-bar bracket comprises first and second cutouts, each extending between respective first and second distal ends. The first and second cutouts are concavely shaped to mount onto the axle housing. Extending from the first and second distal ends are first and second lateral walls, each extending to respective first and second corner sections. Extending between the first and second corner sections is a top wall having at least one hole.

The dampener bracket comprises an interior mount wall mounted onto a base, extending from the interior mount wall are first and second corner sections. Extending from the first and second corner sections are a lower wall and an upper wall that terminate at first and second distal edges respectively. The base has first and second ends, and first and second lateral ends. Also mounted onto the base is an interior wall that terminates at a third distal edge and has a first hole. Extending from the interior wall is a base wall, which continues to an exterior wall that terminates at a fourth distal edge and has a second hole.

It is therefore one of the main objects of the present invention to provide a truck front axle adaptor kit to convert two-wheel trucks to four-wheel drive, also defined as, all-wheel drive, AWD, 4WD, or 4×4 ("four by four") to enable a drivetrain that allows all four wheels of the truck to receive torque from the truck's engine.

It is another object of this invention to provide a truck front axle adaptor kit to convert two-wheel trucks to four-wheel drive, which is of a durable and reliable construction.

It is yet another object of this invention to provide such a device that is inexpensive to manufacture and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which:

FIG. 6A is an isometric view of a connector.

FIG. 6B is an isometric view of a spacer assembly.

FIG. 6C is an isometric view of an automatic transmission mount.

FIG. 7 is an exploded view of the transmission to transfer case adaptor kit for a 1988-2004 manual transmission with a prior art transfer case.

FIG. 9 is an isometric view of the transmission to transfer case adaptor kit installed onto the prior art two-wheel drive production truck seen in FIG. 1.

FIG. 10 is an isometric view of a prior art transfer case.

FIG. 10A is an isometric view of a prior art transfer case hub.

DETAILED DESCRIPTION OF THE PREFERRED EMBODIMENT

Figure 1:
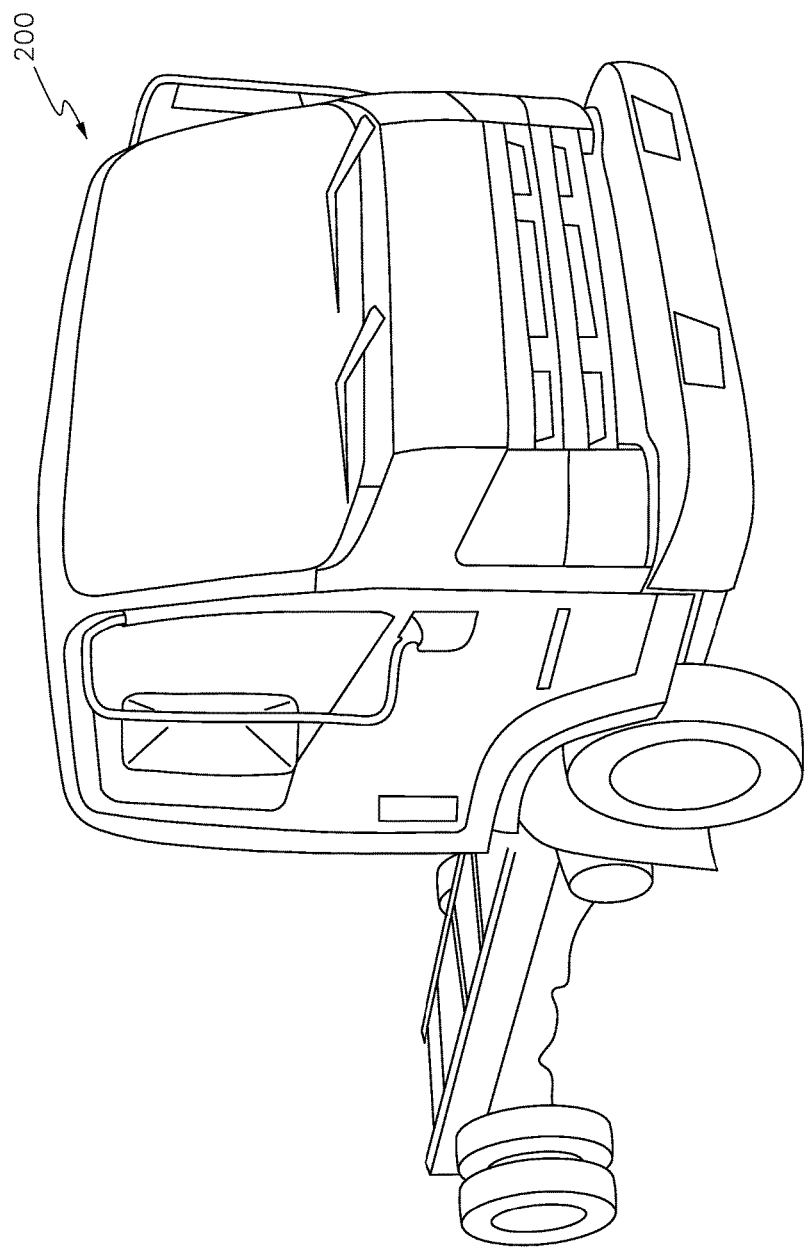
FIG. 1 is a perspective view of a two-wheel drive production truck.

Referring now to the drawings, the present invention is a front axle adaptor kit and is generally referred to with numeral 10. It can be observed that it basically includes front differential assembly 20, shock absorber brackets 30, spring support brackets 70, track-bar bracket 110, and dampener bracket 130.

Seen in FIG. 1 is a two-wheel drive production truck 200. For purposes of illustration, two-wheel drive production truck 200 is an "ISUZU N-series" two-wheel drive medium duty truck produced by Isuzu, and specifically an "NPR" model. Two-wheel drive production truck 200 is a production vehicle or production truck that is mass-produced as an identical model, offered for sale to the public, and able to be legally driven on public roads (street legal). In a preferred embodiment, two-wheel drive production truck 200 "ISUZU N-series" two-wheel drive medium duty truck is between the years 1988-2016.

Figure 2:
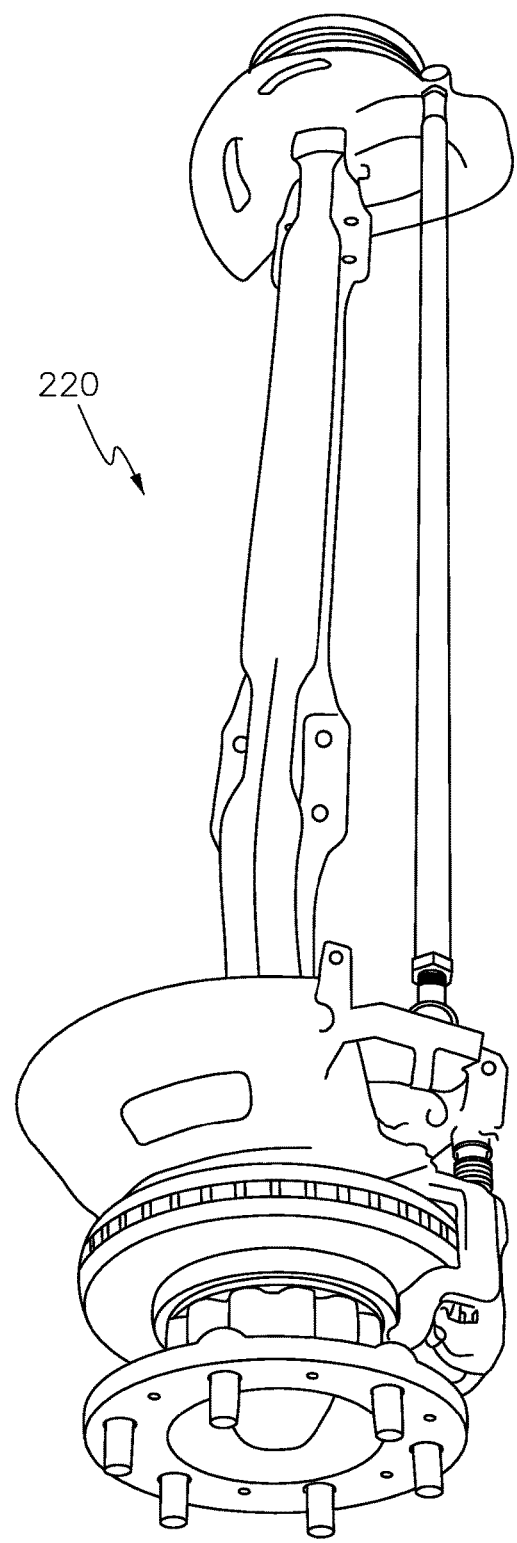
FIG. 2 is an isometric view of a prior art front axle of the two-wheel drive production truck seen in FIG. 1.

Seen in FIG. 2 is prior art front axle 220 of two-wheel drive production truck 200. With prior art front axle 220, a drivetrain of two-wheel drive production truck 200 only allows its rear wheels to receive torque from its engine.

Figure 3:
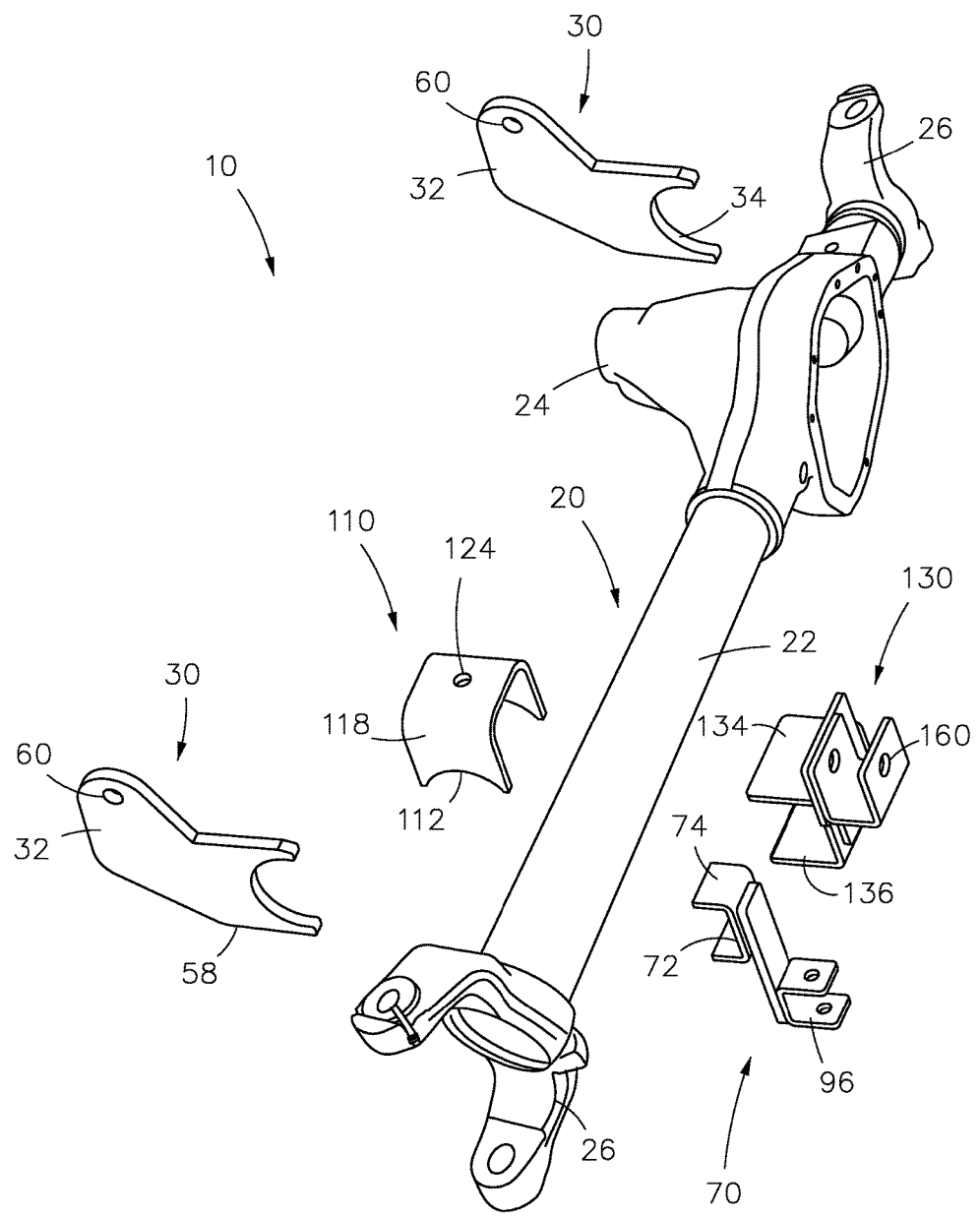
FIG. 3 is an exploded view of the replacement front differential assembly with adaptor kit mounting brackets.

Seen in FIG. 3 is an exploded view of front axle adaptor kit 10. Replacing prior art front axle 220 is front differential assembly 20 with adaptor kit mounting brackets. Specifically, mounted onto front differential assembly 20 are shock absorber brackets 30, spring support brackets 70, track-bar bracket 110, and dampener bracket 130. For purposes of illustration, front differential assembly 20 is from "FORD SUPER DUTY" four-wheel drive series trucks, and specifically from "F-250" through "F-550" models that are mass-produced as identical models, offered for sale to the public, and able to be legally driven on public roads (street legal). In a preferred embodiment, front differential assembly 20 is from "FORD SUPER DUTY" four-wheel drive series trucks between the years 1999-2012. Front differential assembly 20 comprises axle housing 22, front differential 24, and axles 26.

Figure 3A:
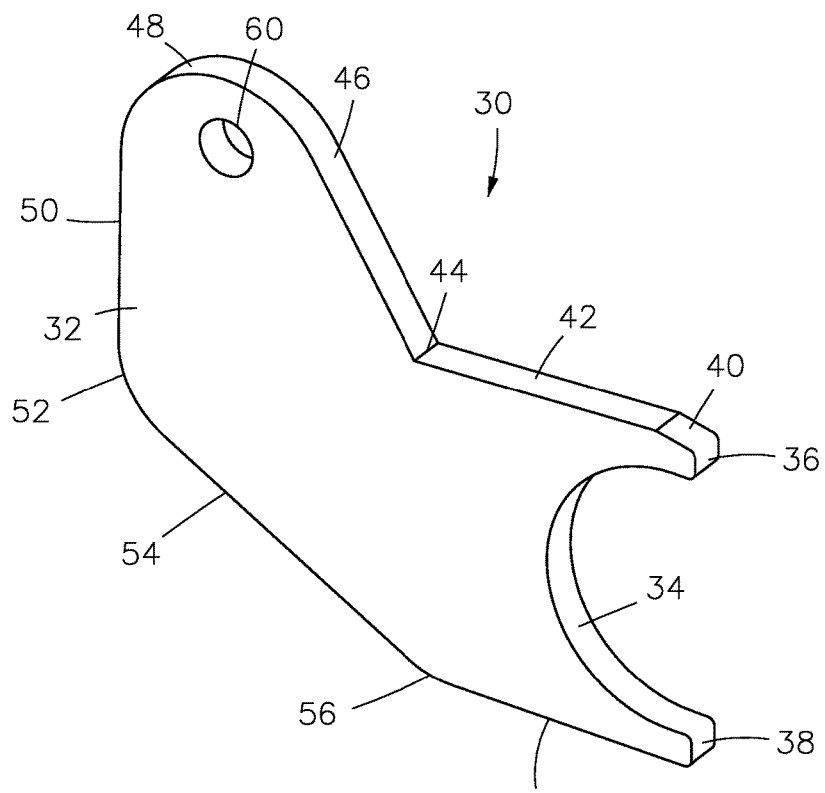
FIG. 3A is an isometric view of shock absorber brackets.

As seen in FIG. 3A, shock absorber bracket 30 comprises sidewall 32 having hole 60, and cutout 34 extending between distal ends 36 and 38. In a preferred embodiment, cutout 34 is concavely shaped to mount onto an outside diameter of axle housing 22. Extending from distal end 36 is angled edge 40 that extends to upper perimeter edge 42. Upper perimeter edge 42 extends to end 44. Extending from end 44 is upper sloped edge 46 that continues to upper rounded edge 48, which extends to rear edge 50. Extending from rear edge 50 is lower rounded edge 52 that continues to lower sloped edge 54, which extends to lower corner 56. Lower perimeter edge 58 extends from lower corner 56 to distal end 38.

Figure 3B:
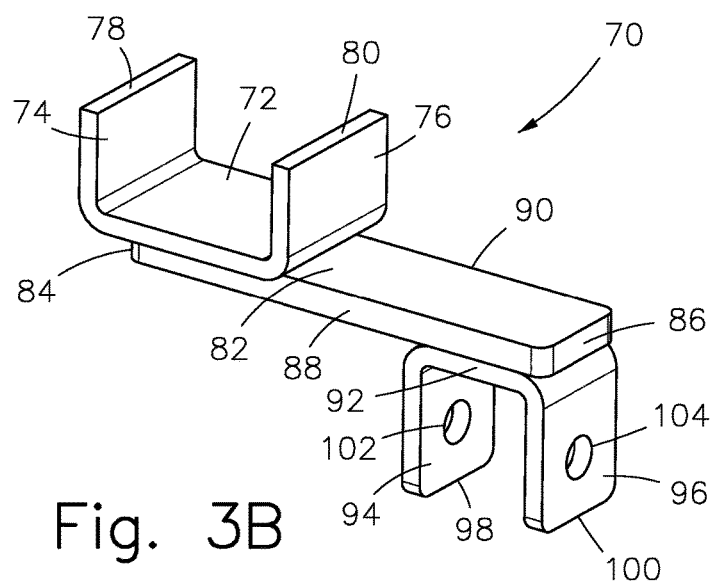
FIG. 3B is an isometric view of a "U" shaped spring support bracket.

As seen in FIG. 3B, spring support bracket 70 comprises interior mount wall 72 mounted onto base 82. Extending from interior mount wall 72 are upper mount wall 74 and lower mount wall 76 that terminate at distal edges 78 and 80 respectively. Base 82 has ends 84 and 86, and lateral ends 88 and 90. Also mounted onto base 82 is spring support mount wall 92 having upper mount wall 94 and lower mount wall 96 with distal edges 98, and 100 and holes 102 and 104 respectively.

Figure 3C:
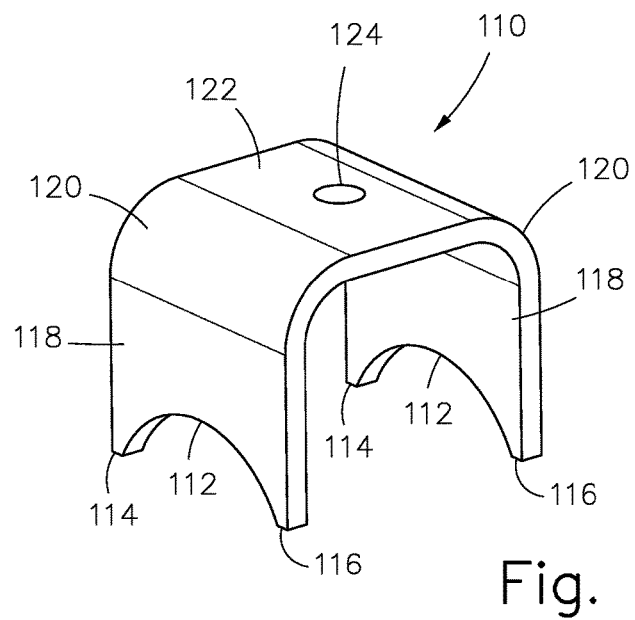
FIG. 3C is an isometric view of a track-bar bracket.

As seen in FIG. 3C, track-bar bracket 110 comprises first and second cutouts 112, each extending between respective distal ends 114 and 116. In a preferred embodiment, first and second cutouts 112 are concavely shaped to mount onto the outside diameter of axle housing 22. Extending from distal ends 114 and 116 are lateral walls 118, each extending to respective corner sections 120. Extending between corner sections 120 is top wall 122 having hole 124.

Figure 3D:
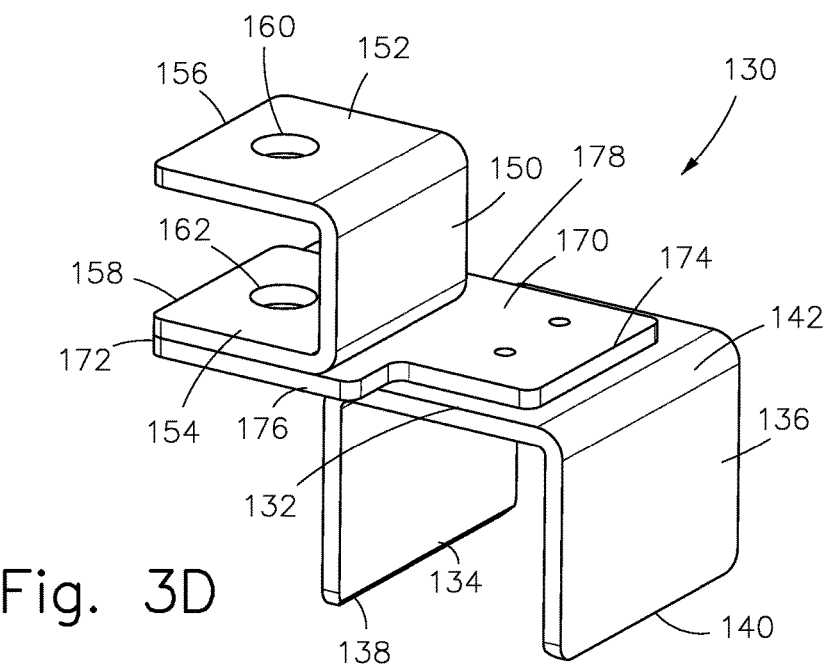
FIG. 3D is an isometric view of a dampener bracket.

As seen in FIG. 3D, dampener bracket 130 comprises interior mount wall 132 mounted onto base 170. Extending from interior mount wall 132 are corner sections 142, and 144 seen in FIG. 4. Extending from corner sections 142 and 144 are lower wall 136 and upper wall 134 that terminate at distal edges 140 and 138 respectively. Base 170 has ends 172 and 174, and lateral ends 176 and 178. Also mounted onto base 170 is interior wall 154 that terminates at distal edge 158 and has hole 162. Extending from interior wall 154 is base wall 150, which continues to exterior wall 152 that terminates at distal edge 156 and has hole 160.

Figure 4:
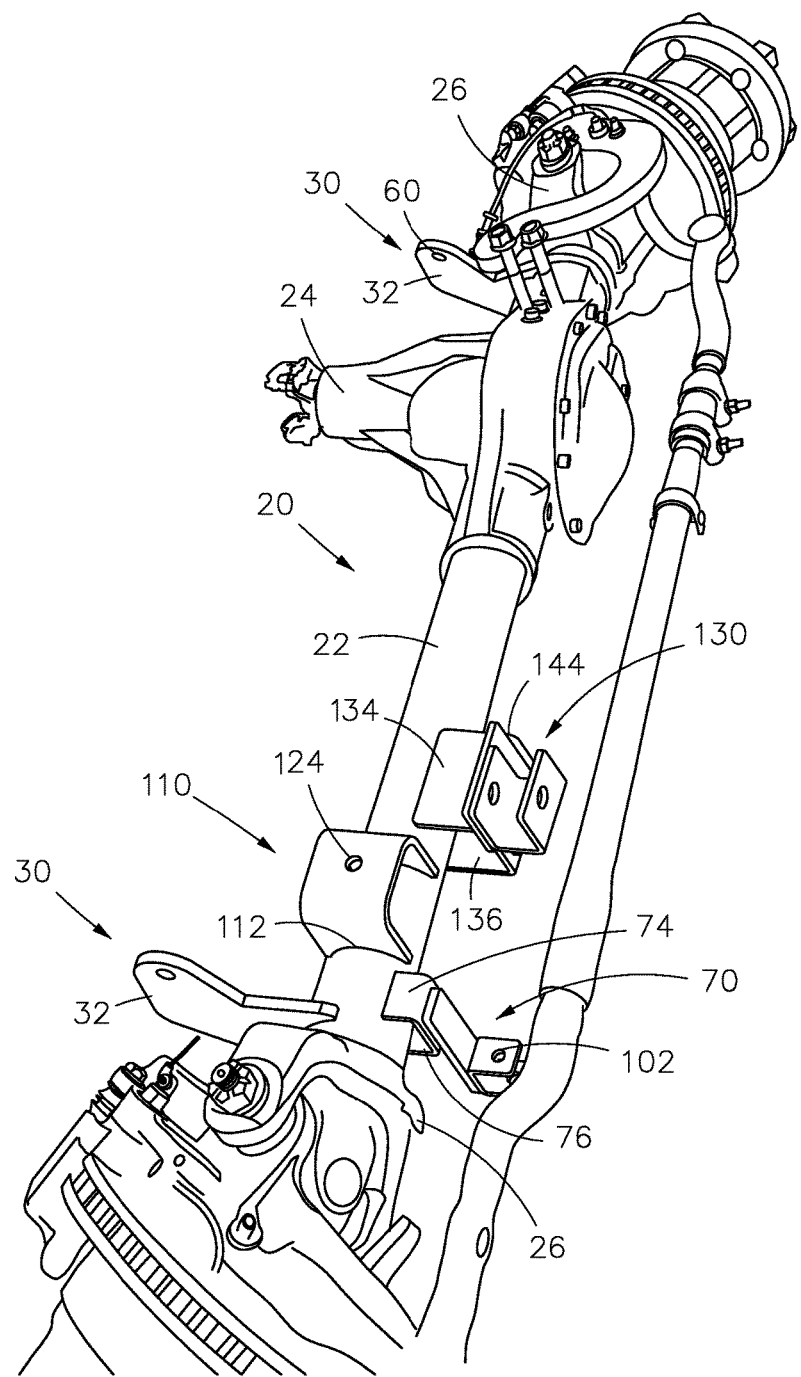
FIG. 4 is an isometric view of the replacement front differential assembly with adaptor kit mounting brackets mounted thereon and ready to be installed onto the two-wheel drive production truck seen in FIG. 1.

Seen in FIG. 4 is an isometric view of the front axle adaptor kit replacement front differential assembly 20 with adaptor kit mounting brackets mounted thereon and ready to be installed onto the two-wheel drive production truck seen in FIG. 1. Specifically, mounted onto front differential assembly 20 are shock absorber brackets 30, which in a preferred embodiment are the same, spring support bracket 70, track-bar bracket 110, and dampener bracket 130.

In a preferred embodiment, a driver side shock absorber bracket 30 is positioned between a driver side axle 26 and front differential 24, and is welded onto axle housing 22. Dampener bracket 130 is positioned at a first predetermined distance from front differential 24, and is welded onto axle housing 22. Track-bar bracket 110 is positioned at a second predetermined distance from front differential 24, and is welded onto axle housing 22. Spring support bracket 70 is positioned at a third predetermined distance from front differential 24, and is welded onto axle housing 22. A passenger side shock absorber bracket 30 is positioned at a fourth predetermined distance from front differential 24, and is welded onto axle housing 22. The fourth predetermined distance is greater than the third predetermined distance. The third predetermined distance is greater than the second predetermined distance. The second predetermined distance is greater than the first predetermined distance.

The front axle adaptor kit replacement front differential assembly 20 with adaptor kit mounting brackets converts a two-wheel drive production truck to four-wheel drive enabling a drivetrain that allows all four wheels of the truck to receive torque from an engine of the truck, whereby the truck has a transmission system and is retrofitted with a transfer case.

Shock absorber brackets 30, spring support bracket 70, track-bar bracket 110, and dampener bracket 130 may be manufactured from separate metal components, welded together. In a preferred embodiment, shock absorber brackets 30, spring support bracket 70, track-bar bracket 110, and dampener bracket 130, are each manufactured as single embodiments.

Figure 5:
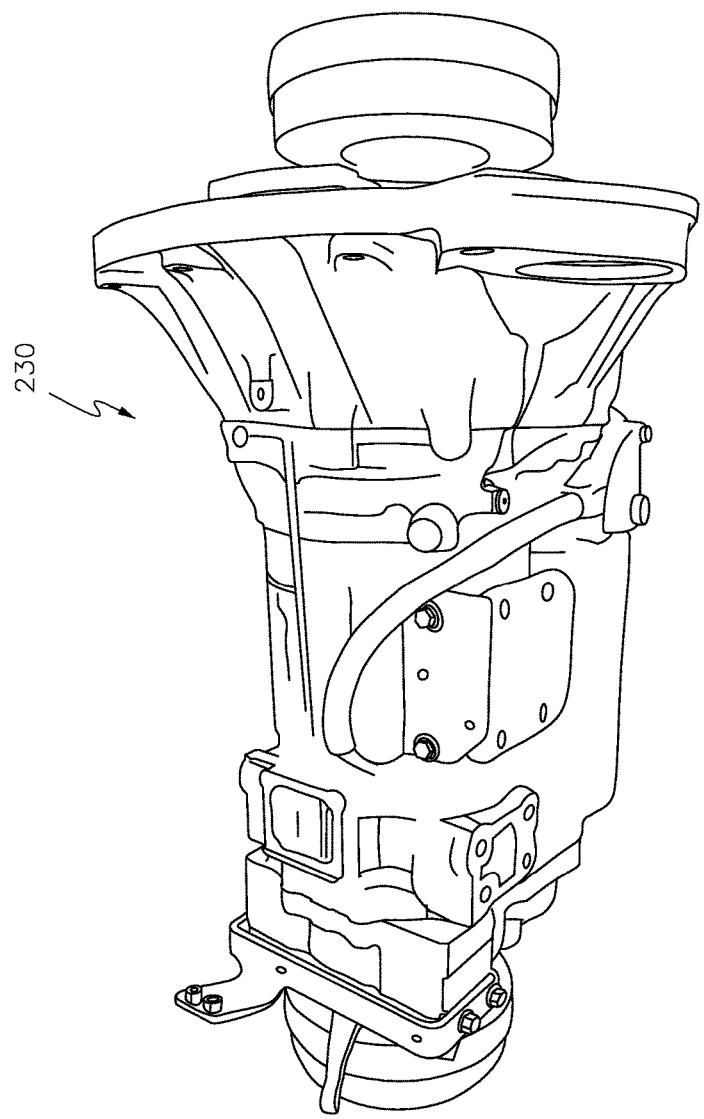
FIG. 5 is an isometric view of a prior art transmission assembly and parking brake system of the two-wheel drive production truck seen in FIG. 1.

Seen in FIG. 5 is prior art transmission assembly 230 of two-wheel drive production truck 200. With prior art transmission assembly 230, a drivetrain of two-wheel drive production truck 200 only allows its rear wheels to receive torque from its engine.

Figure 6:
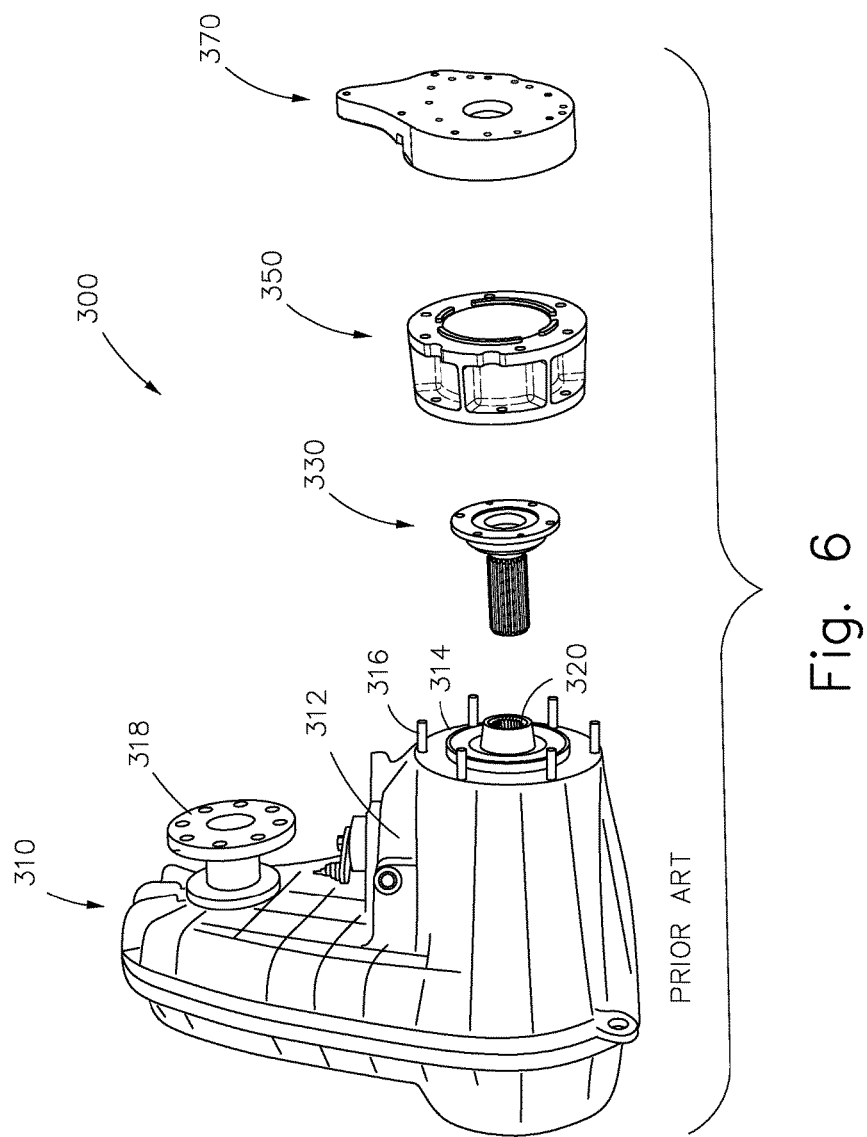
FIG. 6 is an exploded view of the transmission to transfer case adaptor kit for an automatic transmission with a prior art transfer case.

Seen in FIG. 6 is an exploded view of transmission to transfer case adaptor kit 300 for an automatic transmission of two-wheel drive production truck 200. To secure onto prior art transmission assembly 230 is transmission to transfer case adaptor kit 300 comprising transfer case 310, connector 330, and spacer assembly 350.

Transfer case 310 comprises housing 312 having mounting face 314. Protruding from mounting face 314 is a plurality of bolts 316. Transfer case 310 further comprises driveshaft mount 318 and aperture 320. For purposes of illustration, transfer case 310 is from "FORD SUPER DUTY" four-wheel drive series trucks, and specifically from "F-250" through "F-550" models that are mass-produced as identical models, offered for sale to the public, and able to be legally driven on public roads (street legal). In a preferred embodiment, transfer case 310 is from "FORD SUPER DUTY" four-wheel drive series trucks between the years 1999-2012. Transmission to transfer case adaptor kit 300 for an automatic transmission of two-wheel drive production truck 200 also comprises automatic transmission mount 370 as automatic transmission mounting means.

As seen in FIG. 6A, connector 330 comprises mounting face 332 having a plurality of holes 334 and opening 336. Extending from mounting face 332 is angled sidewall 338 that extends to spline 340 having distal end 342.

As seen in FIG. 6B, spacer assembly 350 comprises faces 352 and 356 having a plurality of mounting holes 354 and 358 respectively to receive mounting bolts there through, not show, and sidewall 360.

As seen in FIG. 6C, automatic transmission mount 370 comprises mounting faces 372 and 378 having a plurality of holes 374 to receive mounting bolts there through, not show, and sidewall 376. Extending from sidewall 376 is extension mount sidewall 384 that defines extension mount 380 having holes 382 to also receive its respective mounting bolts, not show.

Seen in FIG. 7 is an exploded view of transmission to transfer case adaptor kit 300 for a 1988-2004 manual transmission of two-wheel drive production truck 200. To secure onto prior art transmission assembly 230 is transmission to transfer case adaptor kit 300 comprising transfer case 310, connector 330, and spacer assembly 350. Transmission to transfer case adaptor kit 300 for a 1988-2004 manual transmission of two-wheel drive production truck 200 also comprises manual transmission mount plate 390, top mount plate spacer bracket 410, and bottom mount plate spacer bracket 420 as manual transmission mounting means.

Figures 7D, 7E:
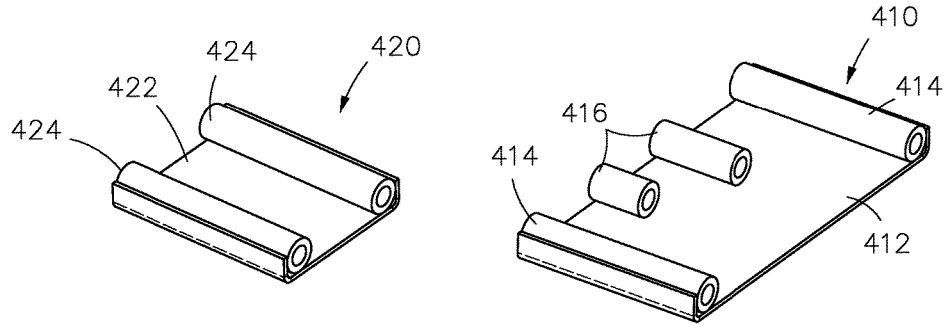
FIG. 7D is an isometric view of a top mount plate spacer bracket.
FIG. 7E is an isometric view of a bottom mount plate spacer bracket.
Figure 7C:
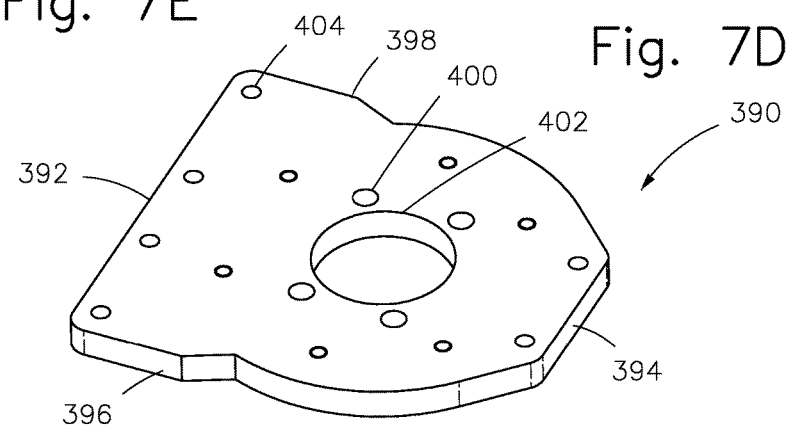
FIG. 7C is an isometric view of a manual transmission mount plate.
Figures 7A, 7B:
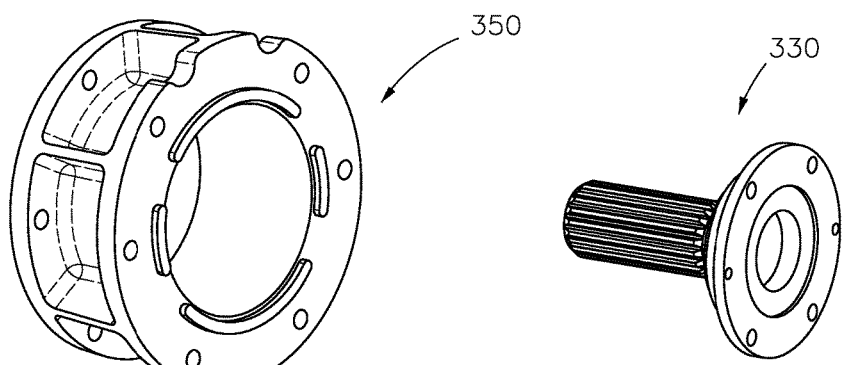
FIG. 7A is an isometric view of a connector.
FIG. 7B is an isometric view of a spacer assembly.

Seen in FIG. 7A is connector 330.

Seen in FIG. 7B is spacer assembly 350

As seen in FIG. 7C, manual transmission mount plate 390 comprises top edge 392, bottom edge 394, and side edges 396 and 398. Manual transmission mount plate 390 further comprises a plurality of holes 400 and 404, and opening 402.

As seen in FIG. 7D, top mount plate spacer bracket 410 comprises bracket 412 having bushing spacers 414 at opposite ends and bushing spacers 416 between bushing spacers 414, whereby bushing spacers 416 are not equal in length.

As seen in FIG. 7E, bottom mount plate spacer bracket 420 comprises bracket 422 having bushing spacers 424 at opposite ends.

Figure 8:
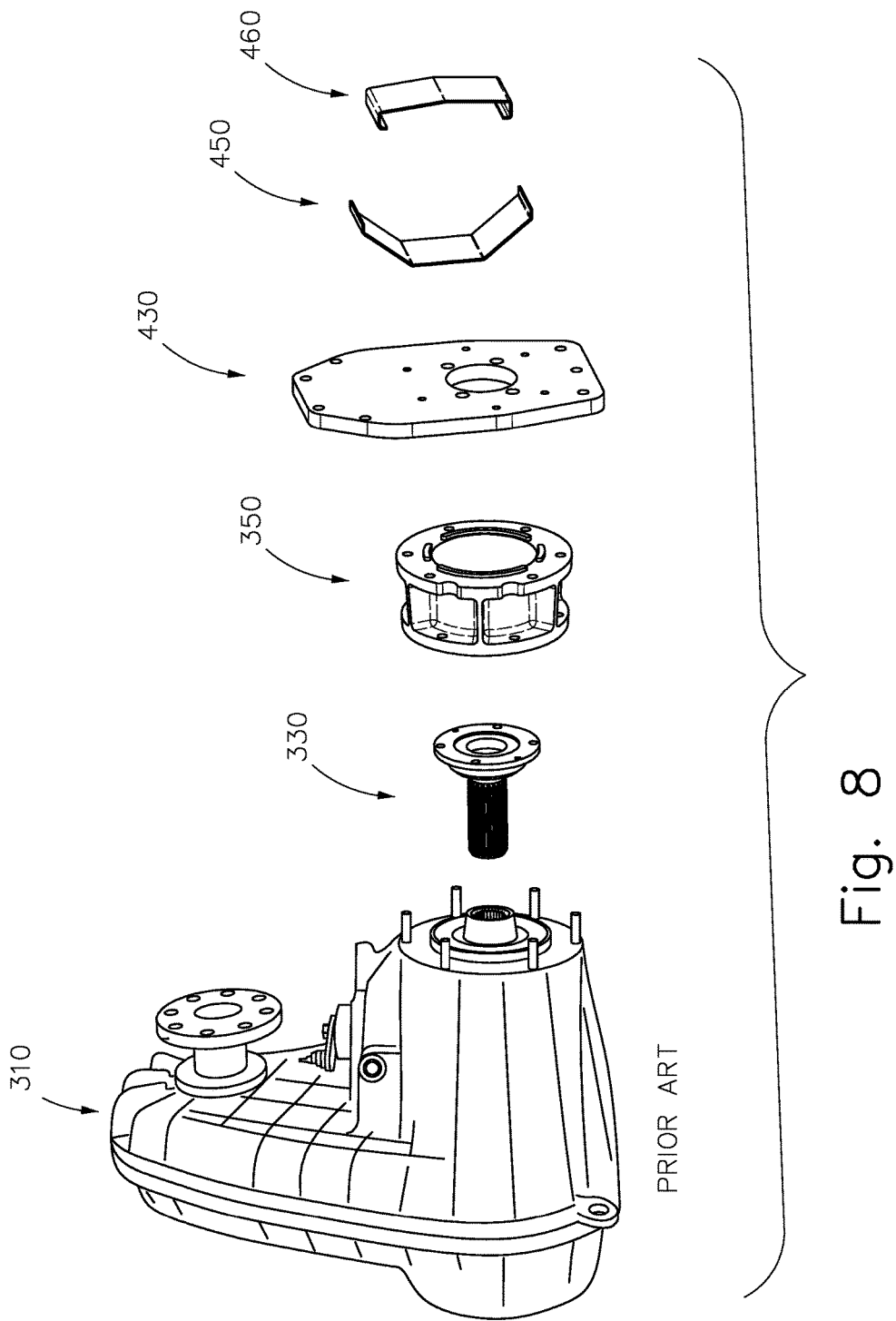
FIG. 8 is an exploded view of the transmission to transfer case adaptor kit for a 2005-2010 manual transmission with a prior art transfer case.

Seen in FIG. 8 is an exploded view of transmission to transfer case adaptor kit 300 for a 2005-2010 manual transmission of two-wheel drive production truck 200. To secure onto prior art transmission assembly 230 is transmission to transfer case adaptor kit 300 comprising transfer case 310, connector 330, and spacer assembly 350. Transmission to transfer case adaptor kit 300 for a 2005-2010 manual transmission of two-wheel drive production truck 200 also comprises manual transmission mount plate 430, top mount plate spacer bracket 450, and bottom mount plate spacer bracket 460 as manual transmission mounting means.

Figure 8D:
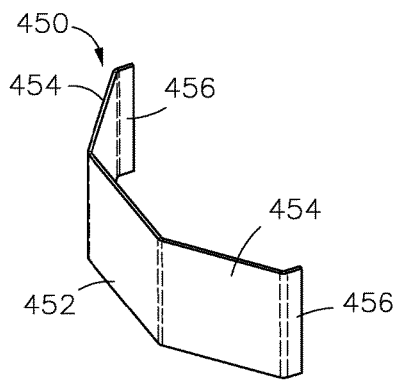
FIG. 8D is an isometric view of a top mount plate spacer bracket.
Figure 8E:
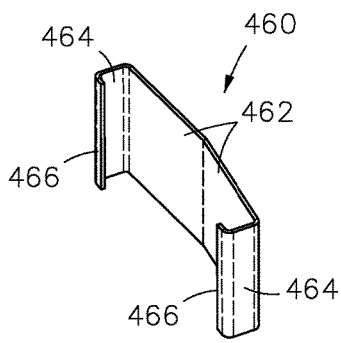
FIG. 8E is an isometric view of a bottom mount plate spacer bracket.
Figure 8C:
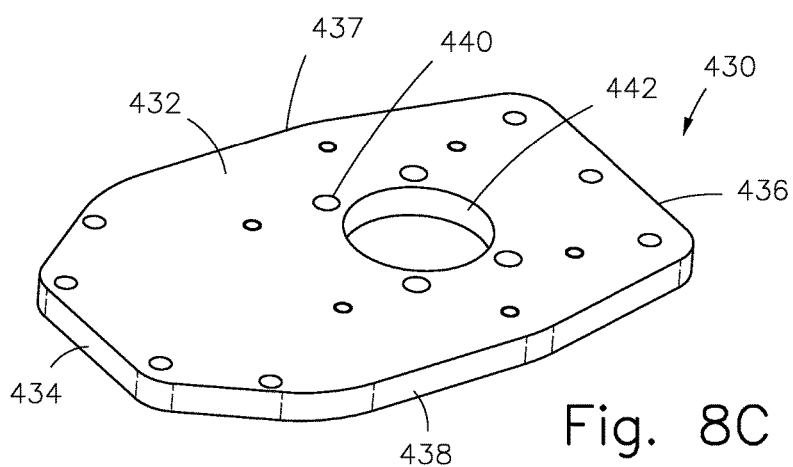
FIG. 8C is an isometric view of a manual transmission mount plate.
Figure 8B:
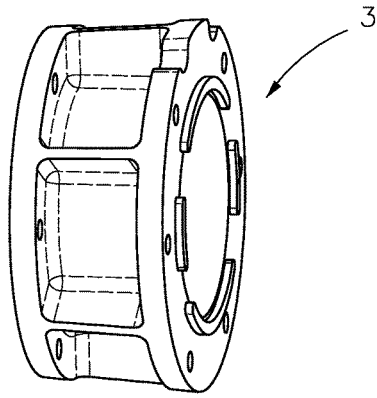
FIG. 8B is an isometric view of a spacer assembly.
Figure 8A:
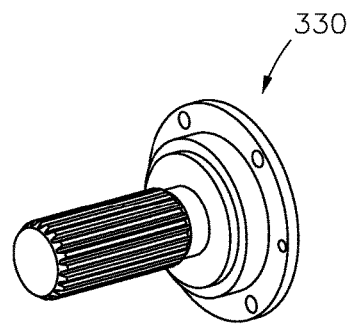
FIG. 8A is an isometric view of a connector.

Seen in FIG. 8A is connector 330.

Seen in FIG. 8B is spacer assembly 350

As seen in FIG. 8C, manual transmission mount plate 430 comprises mount plate 432 having top edge 434, bottom edge 436, and side edges 437 and 438. Manual transmission mount plate 430 further comprises a plurality of holes 440 and opening 442.

As seen in FIG. 8D, top mount plate spacer bracket 450 comprises base 452. Extending from opposite ends of base 452 are wing sections 454 that each have a respective tab 456.

As seen in FIG. 8E, bottom mount plate spacer bracket 460 comprises wing sections 462, each has a respective tab 464 and a lip 466 at its distal end.

Seen in FIG. 9 is an isometric view of transmission to transfer case adaptor kit 300 for an automatic transmission installed onto two-wheel drive production truck 200 seen in FIG. 1. Specifically, secured onto prior art transmission assembly 230 is transmission to transfer case adaptor kit 300 comprising transfer case 310, connector 330, spacer assembly 350, and automatic transmission mount 370. Transmission to transfer case adaptor kit 300 converts a two-wheel drive production truck to four-wheel drive enabling a drivetrain that allows all four wheels of the truck to receive torque from an engine of the truck, whereby the truck has a transmission system and is retrofitted with a front axle adaptor kit, and a transfer case parking brake system adaptor kit and support mount.

Seen in FIG. 10 is transfer case 310, as seen in FIG. 6, with prior art transfer case hub 500 mounted thereon.

As seen in FIG. 10A, prior art transfer case hub 500 comprises housing 502 having base end 504 and distal end 506. Fixedly secure within distal end 506 is bearing 508.

Figure 11:
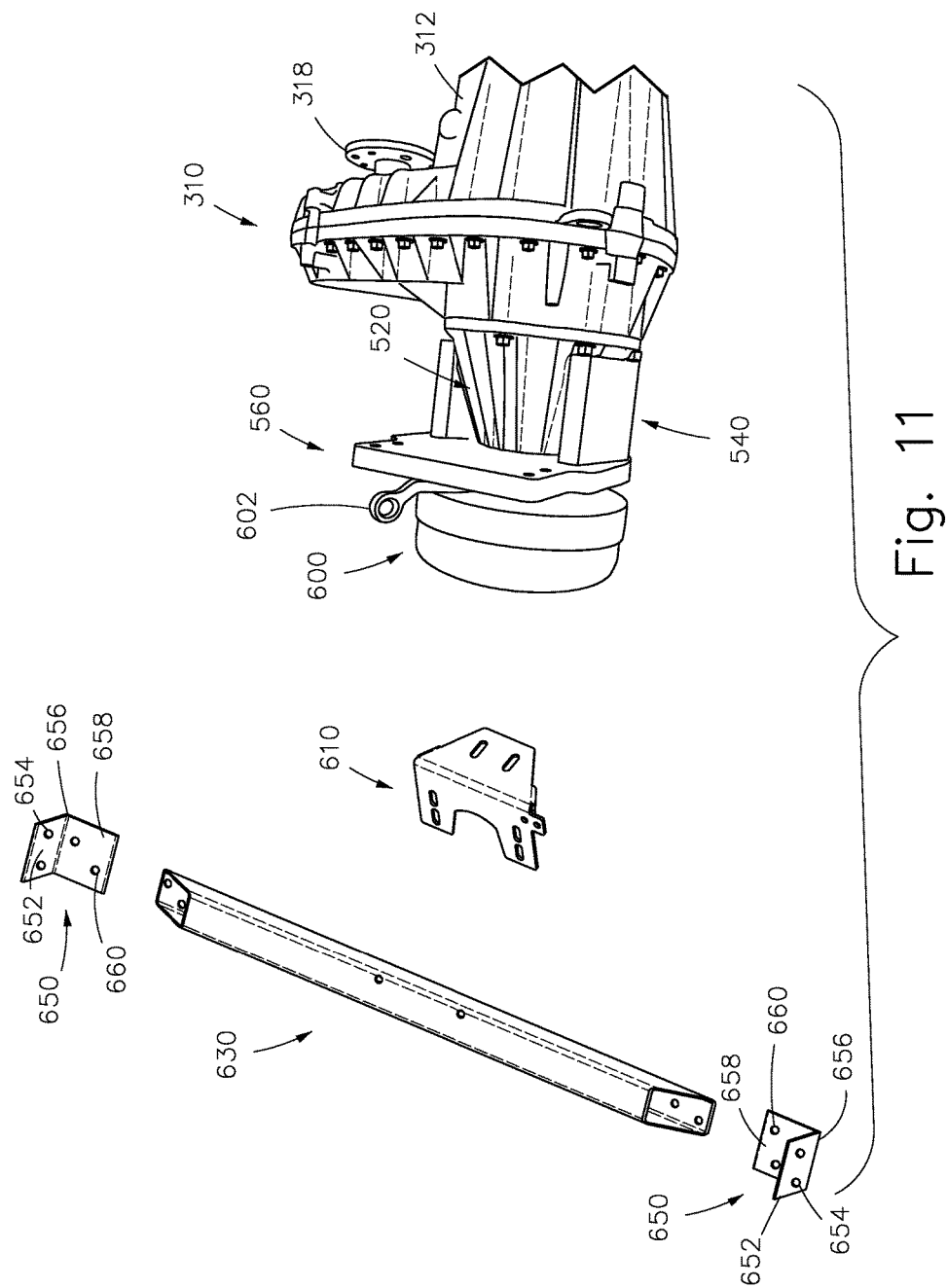
FIG. 11 is an exploded view of the transfer case parking brake system adaptor kit and support mount.

As seen in FIG. 11, transfer case parking brake system adaptor kit and support mount 510 comprises transfer case hub 520, mounting bracket 540, mounting plate 560, shaft guide 580, mount plate 610, mount bar 630, and L-plates 650. As best illustrated herein, each L-plate 650 comprises sidewall 652 having holes 654. Sidewall 652 extends to bend 656. Extending from bend 656 is base wall 658 having respective holes 660. Secured onto mounting plate 560 is brake system 600 having lever 602.

Figure 12:
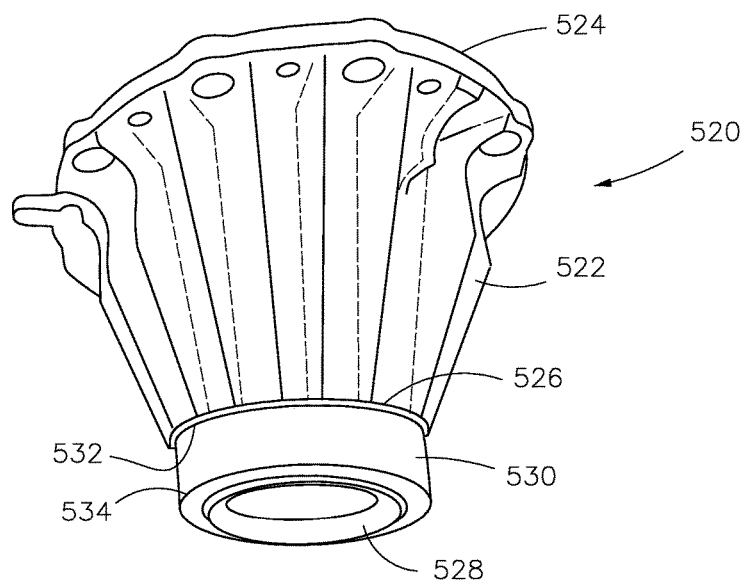
FIG. 12 is an isometric view of the transfer case hub.

As seen in FIG. 12, prior art transfer case hub 500 seen in FIG. 10A has been modified, whereby a predetermined exterior section from housing 502 has been removed resulting in transfer case hub 520. Transfer case hub 520 comprises housing 522 having base end 524 and distal end 526. Extending from distal end 526 is sidewall 530 having ends 532 and 534. Fixedly secure within end 534 is bearing 528.

Figure 13:
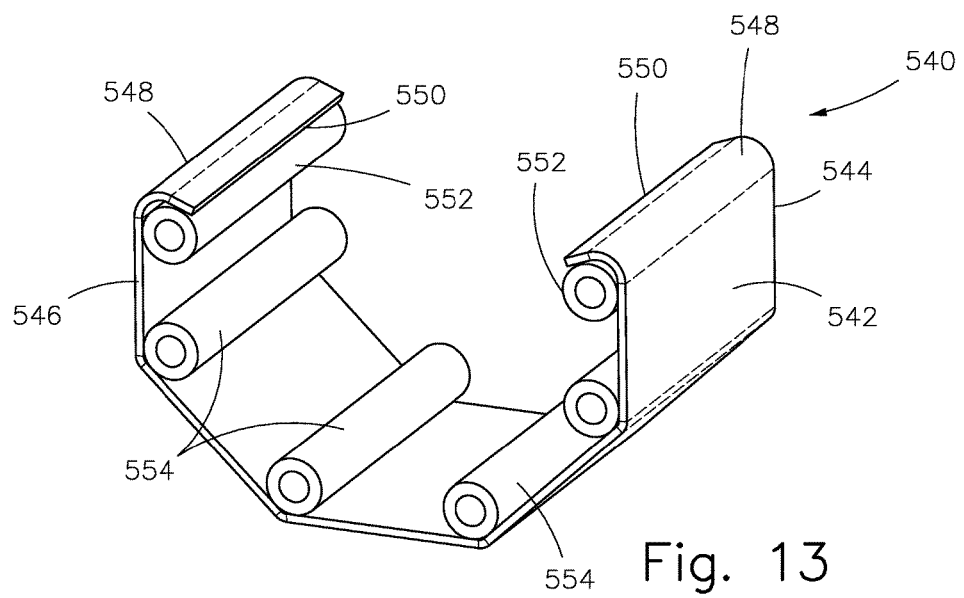
FIG. 13 is an isometric view of a parking brake system adaptor kit mounting bracket.

As seen in FIG. 13, mounting bracket 540 comprises sidewall 542 having edges 544 and 546. Sidewall 542 has first and second bends 548, and terminates at first and second respective ends 550. Affixed at first and second ends 550 are end bushing spacers 552. Positioned between end bushing spacers 552 is at least one bushing spacer 554. In a preferred embodiment, end bushing spacers 552 and at least one bushing spacer 554 extend from edge 544 to edge 546.

Figure 14:
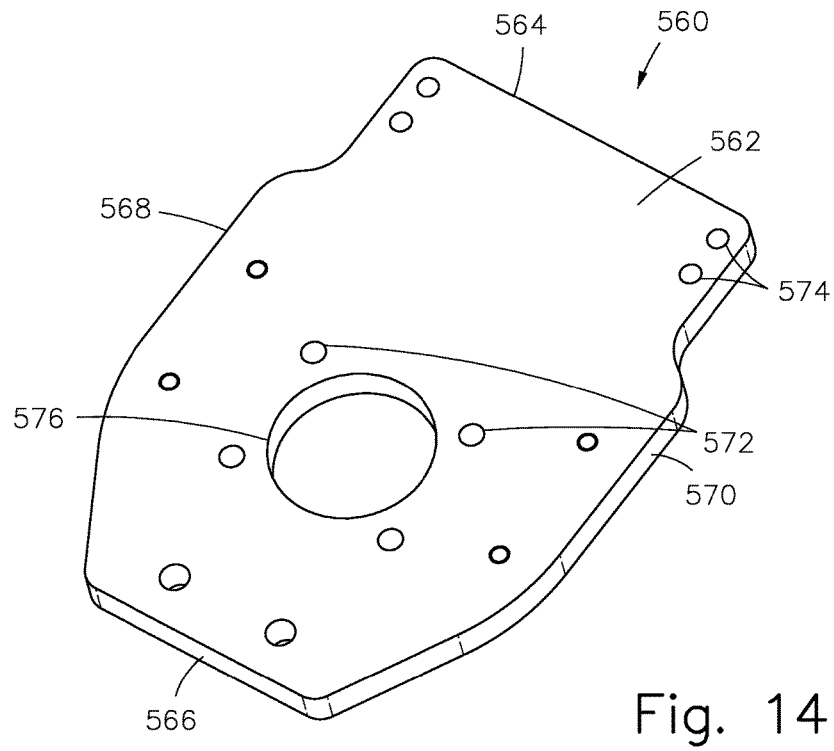
FIG. 14 is an isometric view of the parking brake system adaptor kit mounting plate.

As seen in FIG. 14, mounting plate 560 comprises plate 562 having top edge 564, bottom edge 566, and side edges 568 and 570. Mounting plate 560 further comprises a plurality of holes 572 and 574, and opening 576.

Figure 15:
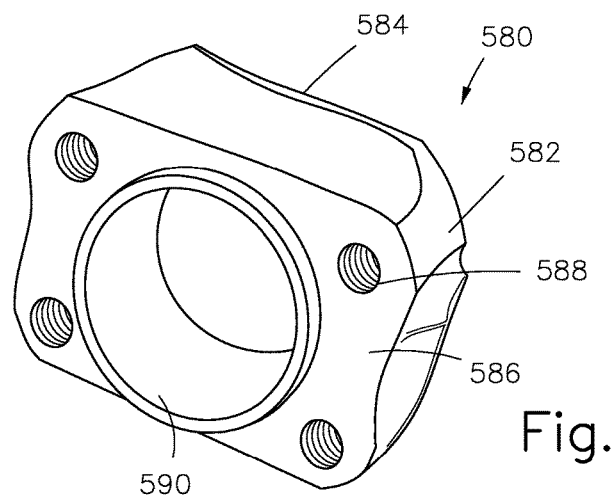
FIG. 15 is an isometric view of the parking brake system adaptor kit shaft guide.

As seen in FIG. 15, shaft guide 580 comprises sidewall 582 defined between faces 584 and 586. Shaft guide 580 further comprises a plurality of holes 588, and opening 590. Shaft guide 580 mounts onto mounting plate 560 between it and brake system 600.

Figure 16:
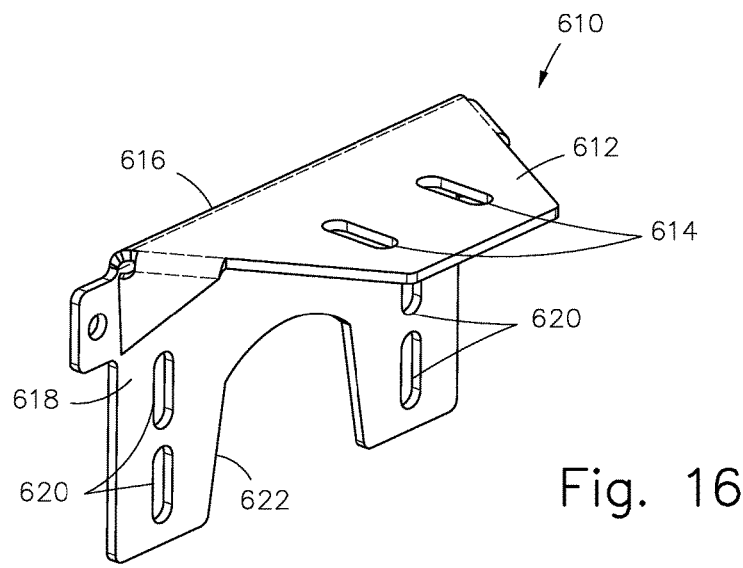
FIG. 16 is an isometric view of the parking brake system adaptor kit support mount plate.

As seen in FIG. 16, mount plate 610 comprises top face 612 having slots 614 to receive mounting bolts. Top face 612 extends to bend 616. Extending from bend 616 is face 618 having respective slots 620, also to receive mounting bolts, and cutout 622.

Figure 17:
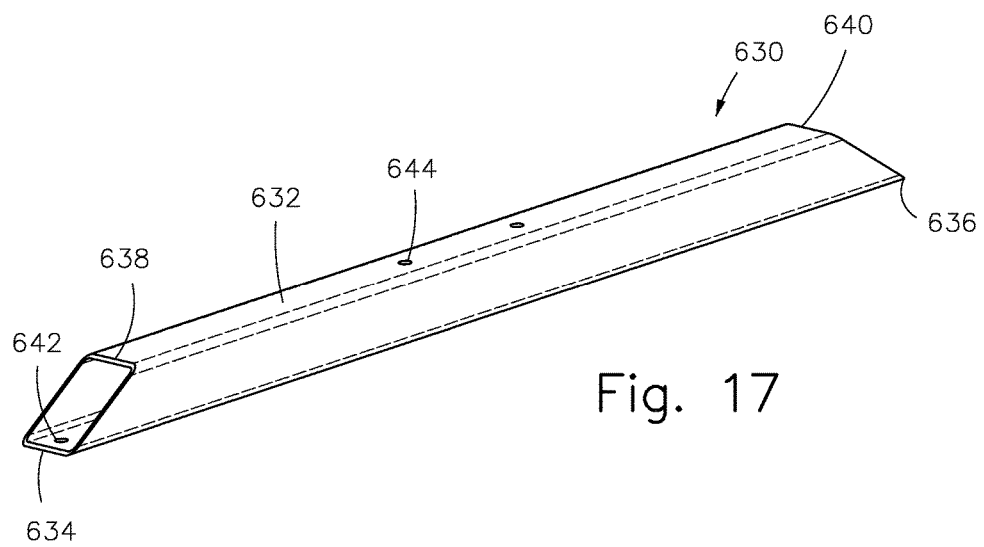
FIG. 17 is an isometric view of the parking brake system adaptor kit support mount bar.

As seen in FIG. 17, mount bar 630 comprises bar 632 having base ends 634 and 636, and top ends 638 and 640. A first distance between base ends 634 and 636 is longer than a second distance between top ends 638 and 640. Base ends 634 and 636 each comprise holes 642 to receive mounting bolts, not seen, and bar 632 comprises mount holes 644 to also receive mounting bolts, seen in FIG. 19.

Figure 18:
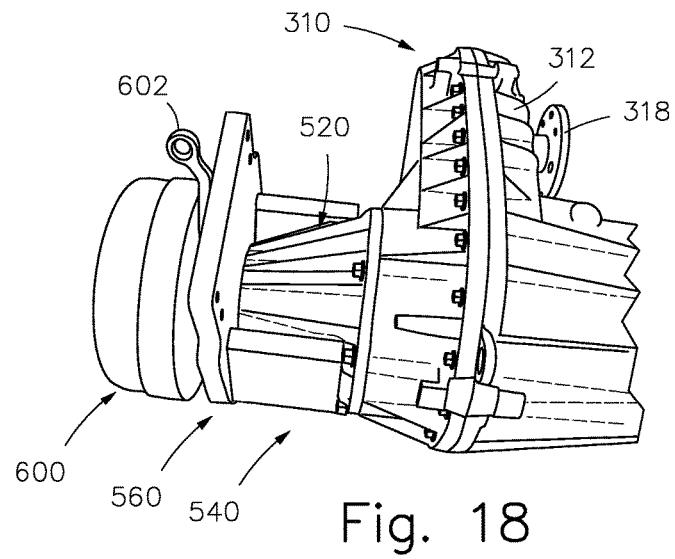
FIG. 18 is an isometric view of the transfer case parking brake system adaptor kit and support mount partly assembled to be installed onto the prior art two-wheel drive production truck seen in FIG. 1.

As seen in FIG. 18, transfer case parking brake system adaptor kit and support mount 510 are partly assembled to be installed onto the prior art two-wheel drive production truck seen in FIG. 1, whereby transfer case hub 520 and mounting bracket 540 are mounted onto transfer case 310, and mounting plate 560 is mounted onto transfer case hub 520 and mounting bracket 540. Brake system 600 having lever 602 is mounted onto mounting plate 560, whereby shaft guide 580 mounts onto mounting plate 560 between it and brake system 600.

Figure 19:
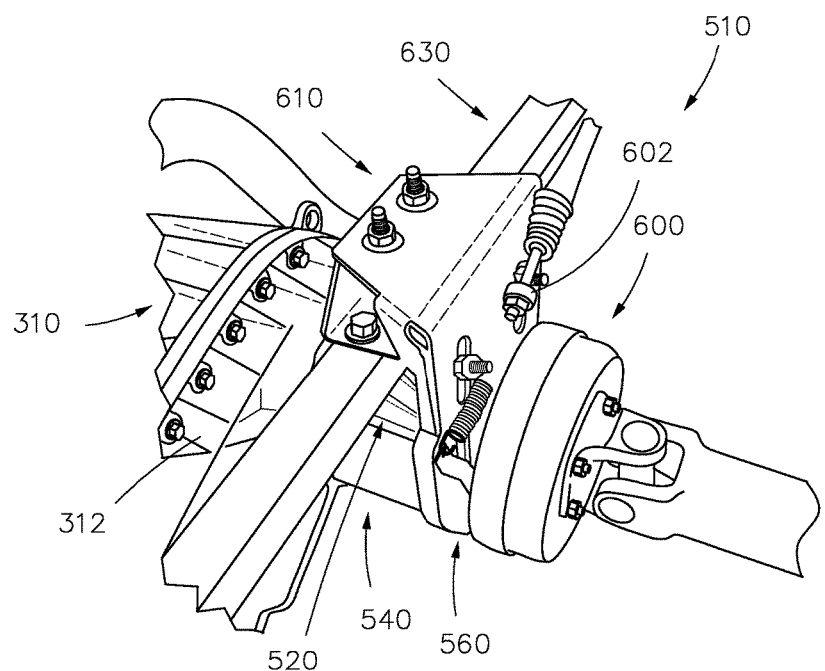
FIG. 19 is an isometric view of the transfer case parking brake system adaptor kit and support mount installed onto the prior art two-wheel drive production truck seen in FIG. 1.

As seen in FIG. 19, transfer case parking brake system adaptor kit and support mount 510 is installed onto the prior art two-wheel drive production truck seen in FIG. 1, whereby transfer case hub 520 and mounting bracket 540 are mounted onto transfer case 310, and mounting plate 560 is mounted onto transfer case hub 520 and mounting bracket 540. Brake system 600 having lever 602 is mounted onto mounting plate 560, whereby shaft guide 580 mounts onto mounting plate 560 between it and brake system 600. Mount plate 610 mounts onto mount bar 630 and mounting plate 560, and L-plates 650, seen in FIG. 11, secure mount bar 630 to a frame section of the prior art two-wheel drive production truck seen in FIG. 1.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A front axle adaptor kit, comprising:
   A) first and second shock absorber brackets;
   B) a spring support bracket comprising a first interior mount wall mounted onto a first base, extending from said first interior mount wall are a first upper mount wall and a first lower mount wall that terminate at first and second distal edges respectively, said first base has first and second ends, and first and second lateral ends, also mounted onto said first base is a spring support mount wall having a second upper mount wall and a second lower mount wall with third and fourth distal edges, and first and second holes respectively;
   C) a track-bar bracket;
   D) a retrofitted transfer case; and
   E) a dampener bracket to convert a two-wheel drive production truck to four-wheel drive, whereby said two-wheel drive production truck comprises an engine, a transmission system, a drivetrain, a front differential assembly, and four wheels, and said drivetrain allows said four wheels to receive torque from said engine.

2. The front axle adaptor kit set forth in claim 1, further characterized in that said dampener bracket comprises a second interior mount wall mounted onto a second base, extending from said second interior mount wall are first and second corner sections, extending from said first and second corner sections are a lower wall and an upper wall that terminate at fifth and sixth distal edges respectively, said second base has third and fourth ends, and third and fourth lateral ends, also mounted onto said second base is an interior wall that terminates at a seventh distal edge and has a third hole, extending from said interior wall is a base wall, which continues to an exterior wall that terminates at a eighth distal edge and has a fourth hole.

* * * * *